United States Patent
Joseph

(10) Patent No.: US 9,642,216 B1
(45) Date of Patent: May 2, 2017

(54) SYSTEMS AND METHODS FOR SYNCHRONIZING LIGHTING DEVICES

(71) Applicant: Stack Labs, Inc., Sunnyvale, CA (US)

(72) Inventor: Neil Joseph, Sunnyvale, CA (US)

(73) Assignee: Stack Labs, Inc., Sunnyvale, CA (US)

( * ) Notice: Subject to any disclaimer, the term of this patent is extended or adjusted under 35 U.S.C. 154(b) by 0 days.

(21) Appl. No.: 15/232,062

(22) Filed: Aug. 9, 2016

Related U.S. Application Data

(60) Provisional application No. 62/203,578, filed on Aug. 11, 2015.

(51) Int. Cl.
*H05B 37/02* (2006.01)
*H05B 33/08* (2006.01)

(52) U.S. Cl.
CPC ..... *H05B 37/0218* (2013.01); *H05B 33/0842* (2013.01); *H05B 37/0272* (2013.01)

(58) Field of Classification Search
CPC ............ H05B 37/0218; H05B 37/0272; H05B 33/0842; H05B 37/0245; H05B 33/0863; H05B 33/0803
USPC ................ 315/158, 207, 324, 307, 297, 312
See application file for complete search history.

(56) References Cited

U.S. PATENT DOCUMENTS

| | | | |
|---|---|---|---|
| 2006/0056855 A1* | 3/2006 | Nakagawa | G09F 9/33 398/183 |
| 2010/0244708 A1* | 9/2010 | Cheung | H05B 37/0218 315/158 |
| 2013/0336660 A1* | 12/2013 | Chin | G01S 1/70 398/118 |
| 2014/0265845 A1* | 9/2014 | Williams | H05B 37/0245 315/86 |
| 2015/0085250 A1* | 3/2015 | Larsen | G06K 9/00604 351/206 |
| 2015/0091451 A1* | 4/2015 | Williams | H02J 9/065 315/160 |
| 2016/0301542 A1* | 10/2016 | Davis | G08C 17/02 |

\* cited by examiner

*Primary Examiner* — Douglas W Owens
*Assistant Examiner* — Syed M Kaiser
(74) *Attorney, Agent, or Firm* — Jones Day

(57) ABSTRACT

Systems and methods are provided for synchronizing a plurality of lighting devices. One or more potential-interference-neighbor (PIN) lighting devices are identified near a master lighting device. The master lighting device outputs a first lighting signal and the one or more PIN lighting devices output one or more second lighting signals. One or more time offsets between the first lighting signal and the one or more second lighting signals are determined. The one or more second lighting signals are adjusted based at least in part on the one or more time offsets to synchronize the first lighting signal and the one or more second lighting signals.

20 Claims, 11 Drawing Sheets

SYSTEMS AND METHODS FOR SYNCHRONIZING LIGHTING DEVICES

CROSS-REFERENCE TO RELATED APPLICATIONS

The present application claims priority to U.S. Provisional Patent Application No. 62/203,578, filed Aug. 11, 2015, titled "Systems and Methods for Synchronizing Lighting Devices" which is herein incorporated by reference.

FIELD

The technology described in this patent document relates generally to electronic circuits and more particularly to lighting devices.

BACKGROUND

In modern lighting systems, multiple lighting devices (e.g., luminaires) are often implemented in proximity. For example, luminaires (e.g., lighting fixtures, bulbs, lamps, modules, etc.) are common lighting devices to provide illumination in buildings or other circumstances. If luminaires or components of a luminaire (e.g., a bulb, tube or module light sources) are near each other and sensors (e.g., for detecting ambient light, motion, temperature, etc.) are embedded in the luminaires, interference may occur among the luminaires, and may cause feedback loops that result in incorrect sensor readings and/or flickers that make users uncomfortable.

Various lighting systems may have interference among luminaires in proximity. FIG. 1 depicts an example diagram showing a luminaire fixture where interference may occur among multiple tube lamps. FIG. 2 depicts an example diagram showing a tracking lighting fixture where interference may occur among multiple lamps.

SUMMARY

In accordance with the teachings described herein, system and methods are provided for synchronizing a plurality of lighting devices. One or more potential-interference-neighbor (PIN) lighting devices are identified near a master lighting device. The master lighting device outputs a first lighting signal and the one or more PIN lighting devices output one or more second lighting signals. One or more time offsets between the first lighting signal and the one or more second lighting signals are determined. The one or more second lighting signals are adjusted based at least in part on the one or more time offsets to synchronize the first lighting signal and the one or more second lighting signals.

In another embodiment, a processor-implemented system is provided for synchronizing a plurality of lighting devices. The system comprises: one or more data processors; and one or more non-transitory computer-readable storage media encoded with instructions for commanding the one or more data processors to execute certain operations. One or more potential-interference-neighbor (PIN) lighting devices are identified near a master lighting device. The master lighting device outputs a first lighting signal and the one or more PIN lighting devices output one or more second lighting signals. One or more time offsets between the first lighting signal and the one or more second lighting signals are determined. The one or more second lighting signals are adjusted based at least in part on the one or more time offsets to synchronize the first lighting signal and the one or more second lighting signals.

In yet another embodiment, a non-transitory machine-readable storage medium is encoded with instructions for commanding one or more data processors to execute operations of a method for synchronizing a plurality of lighting devices. One or more potential-interference-neighbor (PIN) lighting devices are identified near a master lighting device. The master lighting device outputs a first lighting signal and the one or more PIN lighting devices output one or more second lighting signals. One or more time offsets between the first lighting signal and the one or more second lighting signals are determined. The one or more second lighting signals are adjusted based at least in part on the one or more time offsets to synchronize the first lighting signal and the one or more second lighting signals.

DETAILED DESCRIPTION

Figure 1:
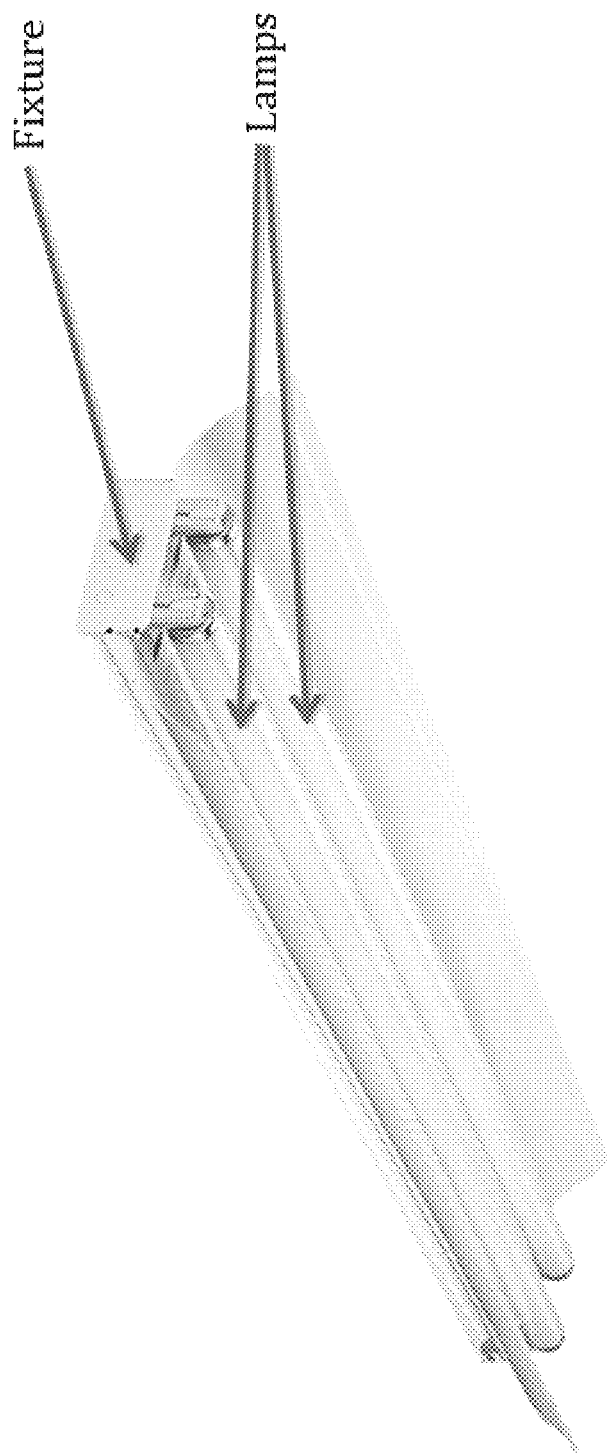
FIG. 1 depicts an example diagram showing a luminaire fixture including multiple tube lamps.
Figure 2:
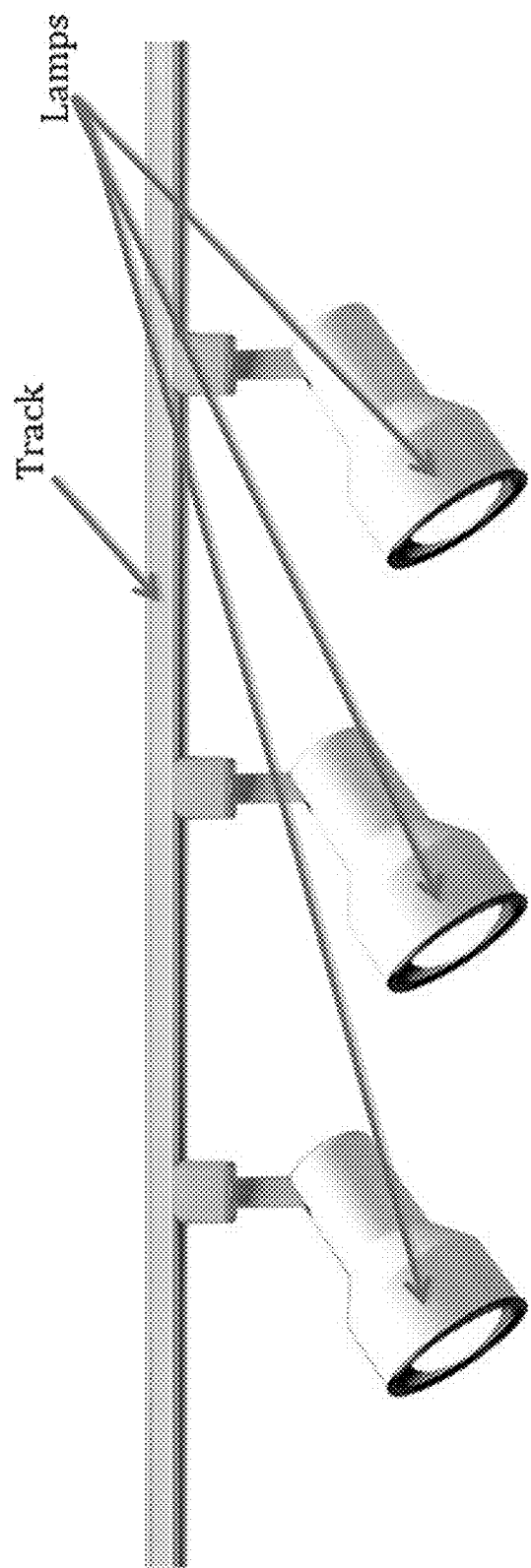
FIG. 2 depicts an example diagram showing a tracking lighting fixture including multiple lamps.
Figure 3:
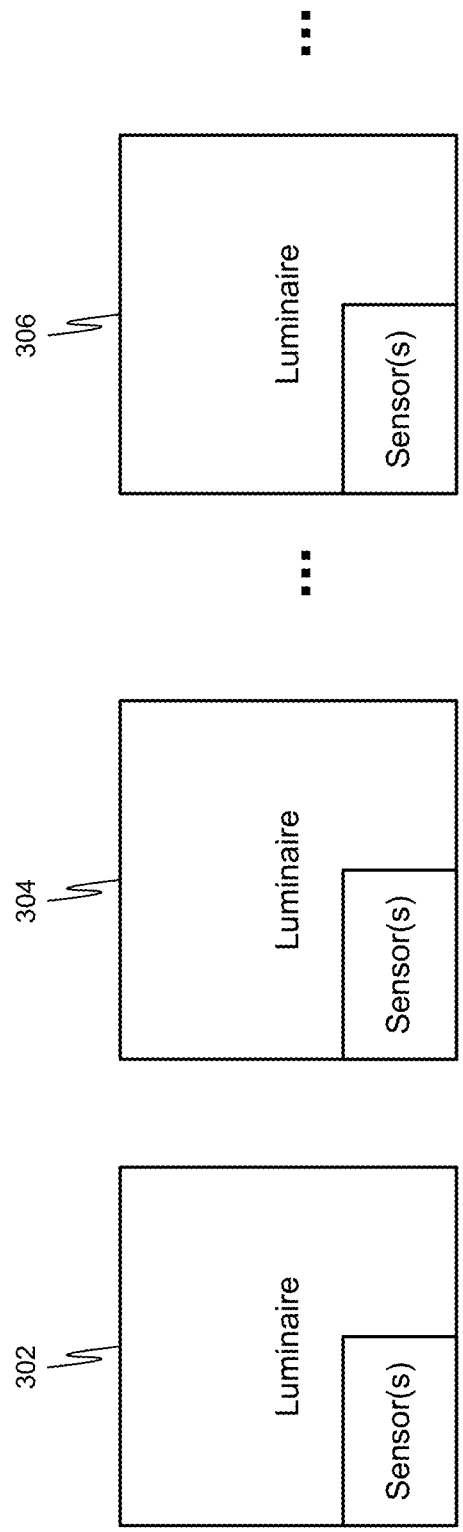
FIG. 3 depicts an example diagram showing a plurality of luminaires implemented in proximity.

FIG. 3 depicts an example diagram showing a plurality of luminaires implemented in proximity. As shown in FIG. 3, each luminaire (e.g., the luminaire 302, 304 or 306) has one or more sensors (e.g., embedded in the luminaire, or installed external to the luminaire) for detecting ambient light. As the luminaires are close to each other, interference among the luminaire may occur if the lighting signals output by the luminaires (corresponding to the light signals received by the sensors of the luminaires) are not synchronized.

Specifically, a master luminaire is selected for synchronization. If the plurality of luminaires include wireless connectivity systems (e.g., implementing the technology of 802.11, 802.15.4, 802.15.1, etc.), received signal strength indication (RSSI) or other known signal strength measurement methods can be adopted to determine which luminaires are closest to the master luminaire. In some embodiments, each luminaire maintains a neighbor table which records data (e.g., signal strength measurement data) associated with neighbor luminaires. If the RSSI of a particular neighbor luminaire is significantly stronger (e.g., 10 times stronger) than any other neighbor luminaires, it indicates that the particular neighbor luminaire may be close enough to produce interference and should be considered a potential interference neighbor (PIN).

Once one or more PIN luminaires are located, a verification process may be performed to verify the PIN luminaires. Then, the output lighting signals of the one or more PIN luminaires are detected using the ambient light sensor of the master luminaire. Pulse width modulation of the lighting signals of the one or more PIN luminaires is performed for synchronizing the master luminaire and the one or more PIN luminaires. For example, the output lighting signals of the luminaires operate at refresh rates below or beyond what human eyes can sense.

Figure 4:
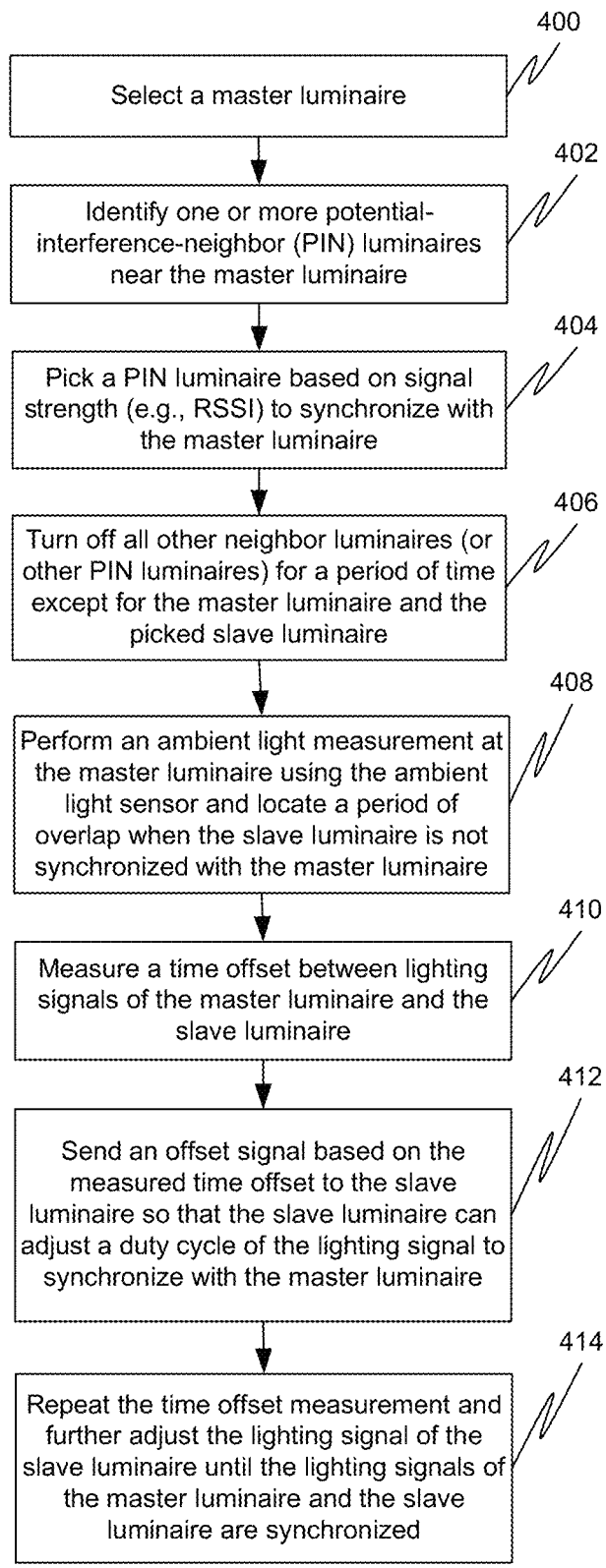
FIG. 4 depicts an example flow chart for synchronizing a plurality of luminaires.

FIG. 4 depicts an example flow chart for synchronizing a plurality of luminaires. At 400, a master luminaire (e.g., a lighting device satisfying certain criteria) can be selected. At 402, potential interference neighbor (PIN) luminaires are identified based on significantly higher wireless signal strength (e.g., RSSI). At 404, a PIN luminaire with highest signal strength (e.g., highest RSSI) is picked to synchronize with the master luminaire first.

Figure 5:
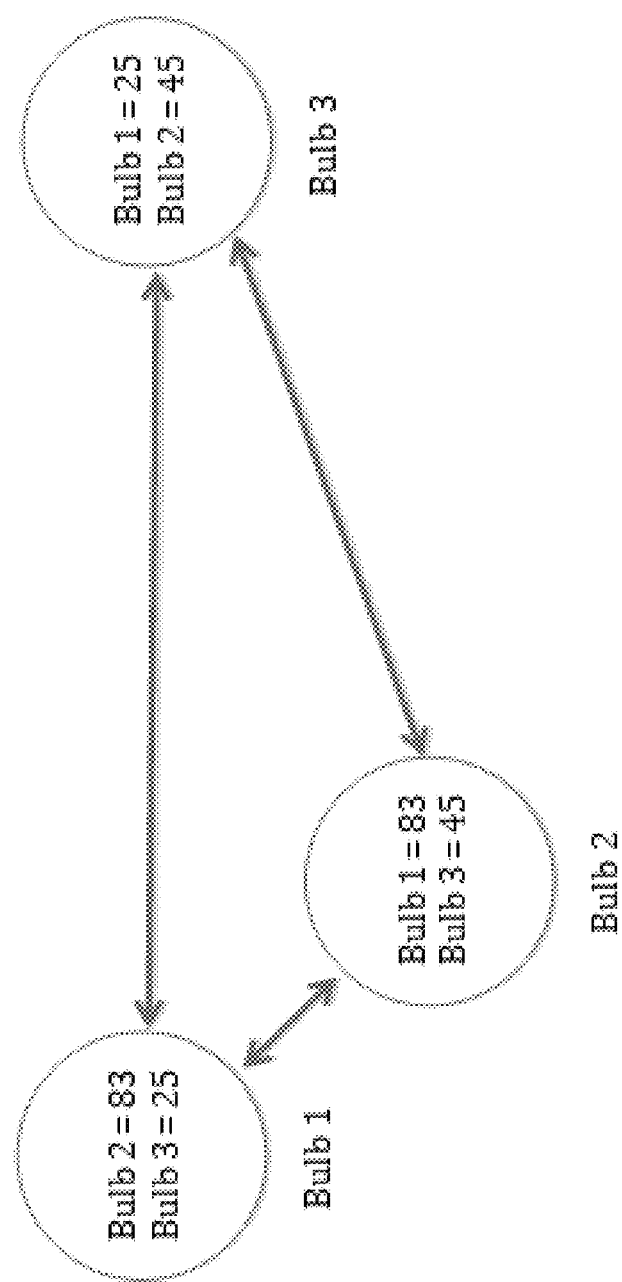
FIG. 5 depicts an example diagram showing luminaires close to each other.

For example, as shown in FIG. 5, Bulb 1 can be selected as the master luminaire and has two neighbor luminaires Bulb 2 and Bulb 3. The signal strength data of the neighbor luminaires detected by the master luminaire Bulb 1 are 83 for Bulb 2 and 25 for Bulb 3. The neighbor luminaires Bulb 2 and Bulb 3 may both be identified as PIN luminaires based on the signal strength data. Compared with Bulb 3, Bulb 2 has significantly higher signal strength, and thus Bulb 2 may be selected as the nearest PIN for synchronization.

Referring back to FIG. 4, at 406, all other neighbor luminaires (or other PIN luminaires) are turned off for a period of time (e.g., 5 seconds) except for the master luminaire and the nearest PIN luminaire (e.g., a slave luminaire) which is picked based on the highest signal strength. At 408, an ambient light measurement is performed at the master luminaire using the ambient light sensor, and a period of overlap when the nearest PIN luminaire (e.g., the slave luminaire) is not synchronized with the master luminaire is to be located.

Figure 6:
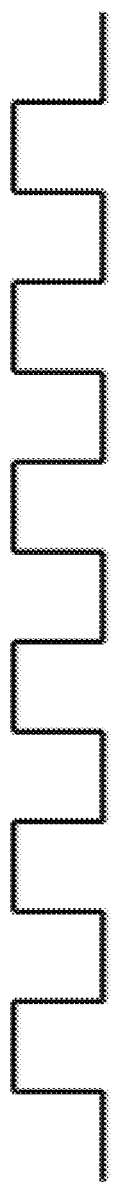
FIG. 6 depicts an example diagram showing a lighting signal of a luminaire.
Figure 7:
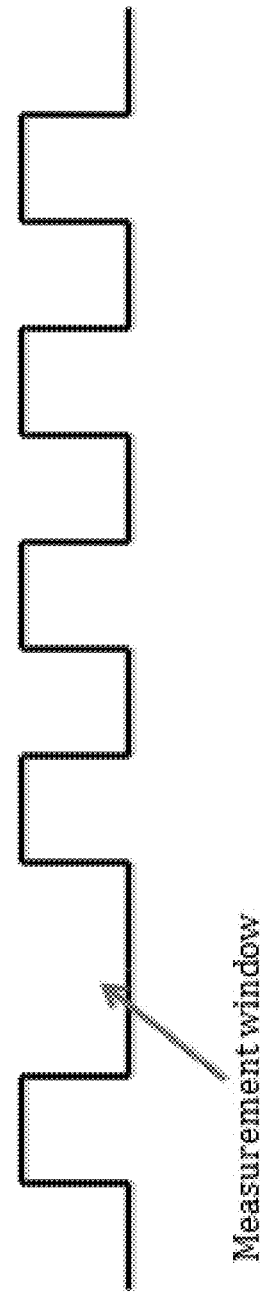
FIG. 7 depicts an example diagram showing a measurement window of a lighting signal.

For example, a luminaire which includes a light-emitting diode (LED) outputs a lighting signal as shown in FIG. 6. When the lighting signal appears at logic high, the LED in the luminaire is on and gives out light. When the lighting signal appears at logic low, the LED in the luminaire is off and does not give out light. For synchronization of luminaires, a measurement window may be determined (e.g., via pulse width modulation) when the lighting signal appears at logic low, as shown in FIG. 7.

Figure 8:
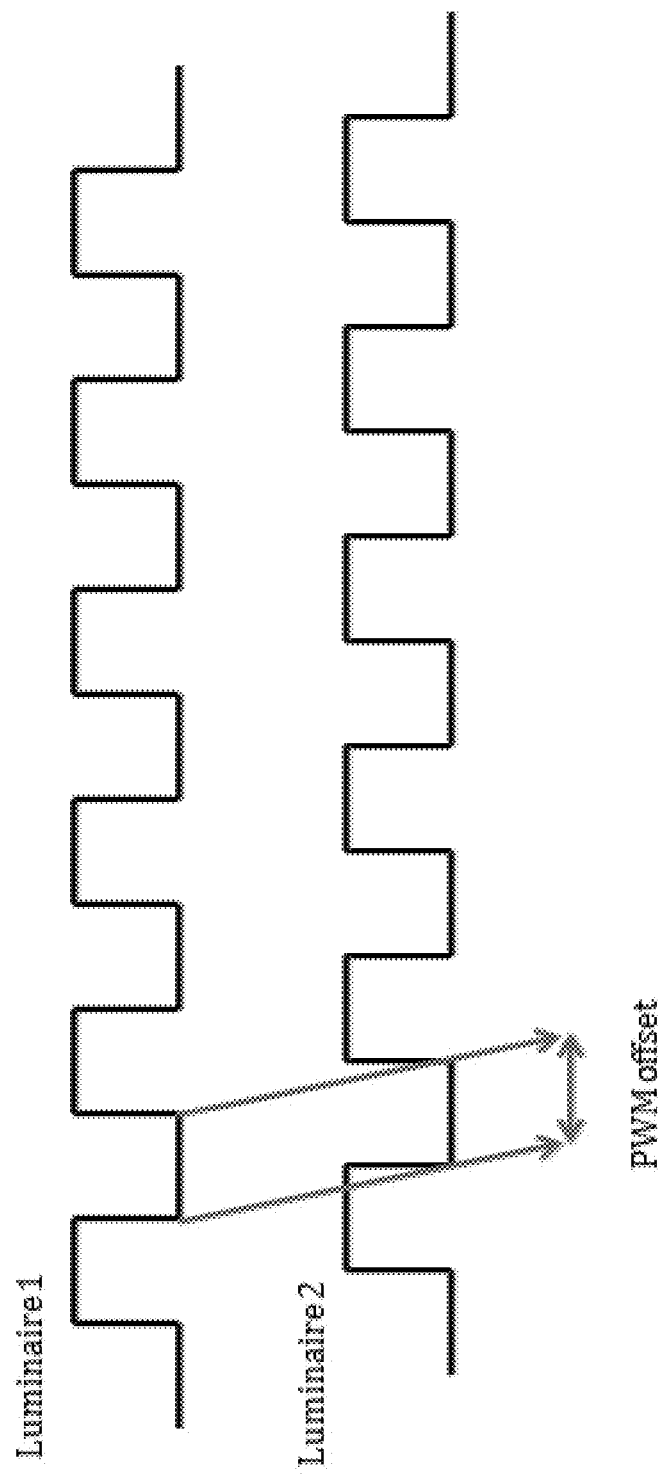
FIG. 8 depicts an example diagram showing lighting signals of luminaires.
Figure 9:
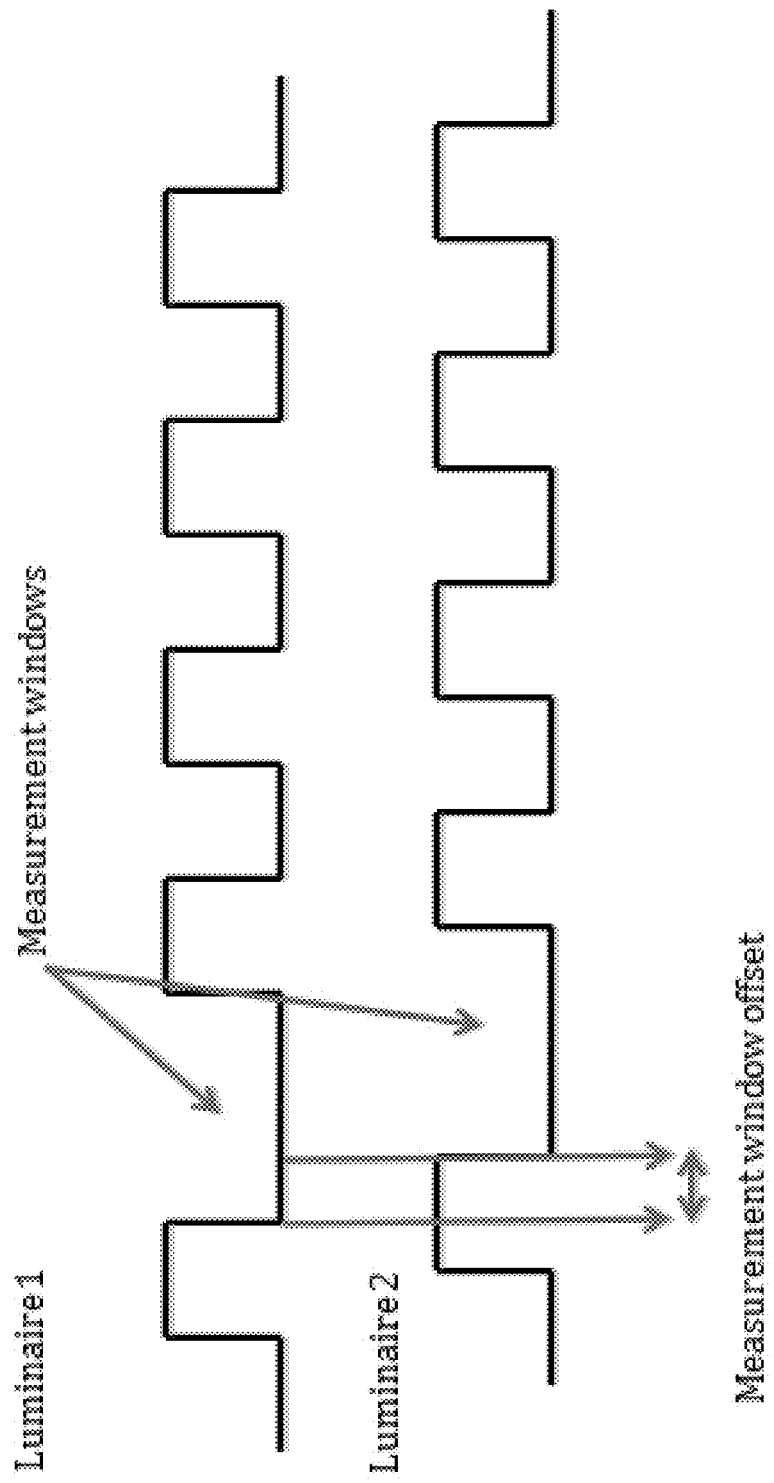
FIG. 9 depicts an example diagram showing offset measurement of lighting signals using measurement windows.

Referring back to FIG. 4, at 410, a time offset between lighting signals of the master luminaire and the slave luminaire is measured. For example, as shown in FIG. 8, the lighting signals output by the master luminaire (e.g., Luminaire 1) and the slave luminaire (e.g., Luminaire 2) indicate that the two luminaires are not synchronized. As shown in FIG. 9, a time offset between the measurement windows of the master luminaire (e.g., Luminaire 1) and the slave luminaire (e.g., Luminaire 2) is determined for the synchronization purpose.

Figure 10:
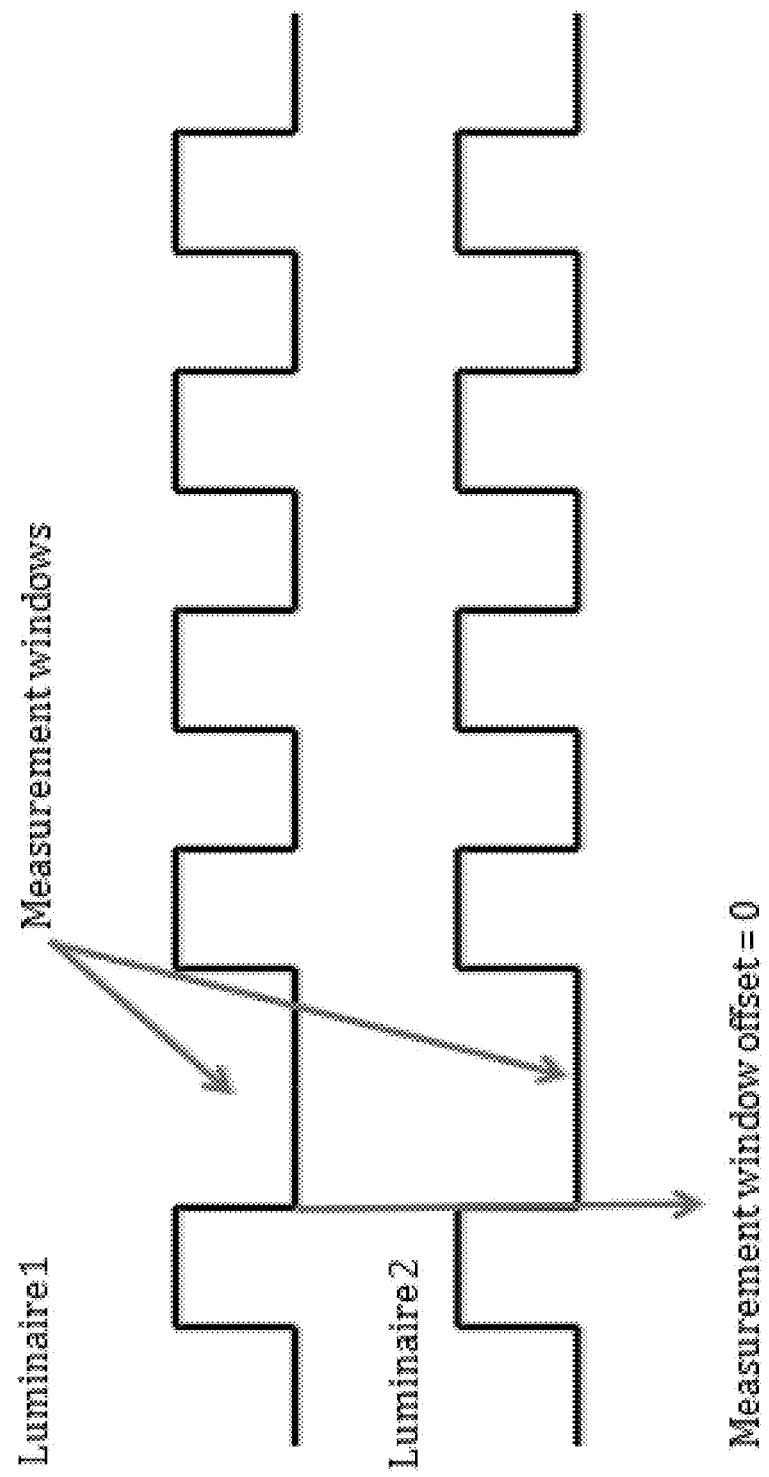
FIG. 10 depicts an example diagram showing synchronized lighting signals.

Referring to FIG. 4, at 412, the master luminaire sends (e.g., via wireless communication) an offset signal based on the measured time offset to the slave luminaire so that the slave luminaire can adjust a duty cycle of the lighting signal to synchronize with the master luminaire. Further, at 414, the time offset measurement may be repeated and further adjustment of the lighting signal of the slave luminaire may be performed until the lighting signals of the master luminaire and the slave luminaire are synchronized. For example, as shown in FIG. 10, when the lighting signals of the master luminaire and the slave luminaire are synchronized, the time offset between the measurement windows of the master luminaire (e.g., Luminaire 1) and the slave luminaire (e.g., Luminaire 2) becomes approximately equal to zero. Once the master luminaire and the slave luminaire are synchronized, a next closest PIN luminaire is chosen as the new slave luminaire and the above-noted operations (e.g., the operations 406-414) are performed again to synchronize the new slave luminaire and the master luminaire. The process continues until lighting signals of all PIN luminaires are synchronized with the lighting signal of the master luminaire.

Figure 11:
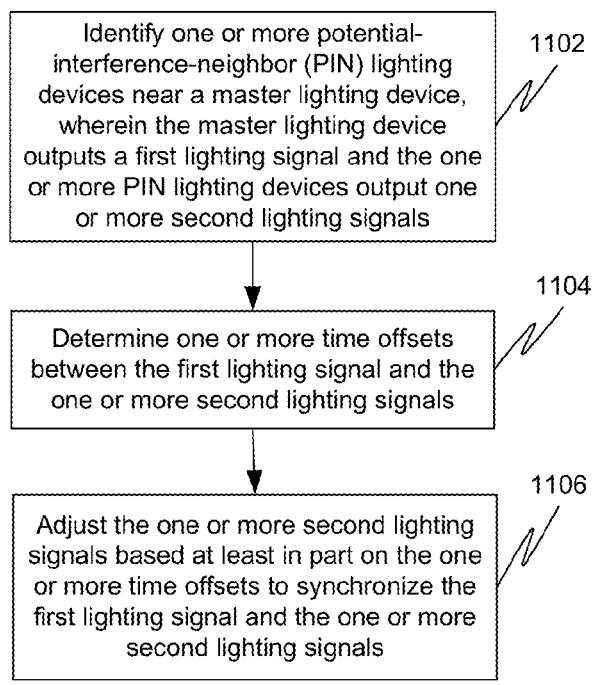
FIG. 11 depicts another example flow chart for synchronizing a plurality of lighting devices.

FIG. 11 depicts another example flow chart for synchronizing a plurality of lighting devices. At 1102, one or more potential-interference-neighbor (PIN) lighting devices near a master lighting device are identified. The master lighting device outputs a first lighting signal and the one or more PIN lighting devices output one or more second lighting signals. At 1104, one or more time offsets between the first lighting signal and the one or more second lighting signals are determined. At 1106, the one or more second lighting signals are adjusted based at least in part on the one or more time offsets to synchronize the first lighting signal and the one or more second lighting signals.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

The invention claimed is:

1. A method for synchronizing a plurality of lighting devices, the method comprising:
   identifying one or more potential-interference-neighbor (PIN) lighting devices near a master lighting device;
   wherein the master lighting device outputs a first lighting signal and the one or more PIN lighting devices output one or more second lighting signals;
   determining one or more time offsets between the first lighting signal and the one or more second lighting signals; and
   adjusting the one or more second lighting signals based at least in part on the one or more time offsets to synchronize the first lighting signal and the one or more second lighting signals.

2. The method of claim 1 wherein the one or more PIN lighting devices are identified based at least in part on received signal strength indication (RSSI) associated with the one or more PIN lighting devices.

3. The method of claim 2 wherein the one or more PIN lighting devices have higher RSSI than other lighting devices near the master lighting device.

4. The method of claim 1 wherein determining the one or more time offsets between the first lighting signal and the one or more second lighting signals includes:
    performing an ambient light measurement; and
    determining the one or more time offsets based at least in part on the ambient light measurement.

5. The method of claim 4 wherein the ambient light measurement is performed using an ambient light sensor associated with the master lighting device.

6. The method of claim 4 wherein the first lighting signal and the one or more second lighting signals are not synchronized during the one or more time offsets.

7. The method of claim 1 wherein performing the ambient light measurement includes: turning off all lighting devices near the master lighting device except the one or more PIN lighting devices.

8. The method of claim 1 wherein the one or more time offsets are approximately equal to zero when the first lighting signal and the one or more second lighting signals are synchronized.

9. The method of claim 1 wherein determining the one or more time offsets between the first lighting signal and the one or more second lighting signals includes:
    determining a first time at which the first lighting signal changes from logic high to logic low; and
    determining one or more second times at which the one or more second lighting signals change from logic high to logic low;
    wherein the one or more time offsets correspond to the difference between the first time and the one or more second times.

10. The method of claim 1 wherein the master lighting device includes one or more light emitting diodes.

11. The method of claim 1, further comprising:
    repeating the determining step and the adjusting step until the first lighting signal and the one or more second lighting signals are synchronized.

12. The method of claim 1, further comprising:
    selecting a first PIN lighting device from the one or more PIN lighting devices;
    determining a first time offset between the first lighting signal and a third lighting signal output by the first PIN lighting device; and
    adjusting the third lighting signal based at least in part on the first time offset to synchronize the first lighting signal and the third lighting signal.

13. The method of claim 12, further comprising:
    selecting a second PIN lighting device from the one or more PIN lighting devices;
    determining a second time offset between the first lighting signal and a fourth lighting signal output by the second PIN lighting device; and
    adjusting the fourth lighting signal based at least in part on the second time offset to synchronize the first lighting signal and the fourth lighting signal.

14. The method of claim 13 wherein the second PIN lighting device has a higher RSSI than the first PIN lighting device.

15. A processor-implemented system for synchronizing a plurality of lighting devices, the system comprising:
    one or more data processors; and
    one or more non-transitory computer-readable storage media encoded with instructions for commanding the one or more data processors to execute operations including:
        identifying one or more potential-interference-neighbor (PIN) lighting devices near a master lighting device;
        wherein the master lighting device outputs a first lighting signal and the one or more PIN lighting devices output one or more second lighting signals;
        determining one or more time offsets between the first lighting signal and the one or more second lighting signals; and
        adjusting the one or more second lighting signals based at least in part on the one or more time offsets to synchronize the first lighting signal and the one or more second lighting signals.

16. The system of claim 15 wherein the one or more PIN lighting devices are identified based at least in part on received signal strength indication (RSSI) associated with the one or more PIN lighting devices.

17. The system of claim 16 wherein the one or more PIN lighting devices have higher RSSI than other lighting devices near the master lighting device.

18. The system of claim 15 wherein determining the one or more time offsets between the first lighting signal and the one or more second lighting signals includes:
    performing an ambient light measurement; and
    determining the one or more time offsets based at least in part on the ambient light measurement.

19. The system of claim 18 wherein the ambient light measurement is performed using an ambient light sensor associated with the master lighting device.

20. A non-transitory machine-readable storage medium encoded with instructions for commanding one or more data processors to execute operations of a method for synchronizing a plurality of lighting devices, the method comprising:
    identifying one or more potential-interference-neighbor (PIN) lighting devices near a master lighting device;
    wherein the master lighting device outputs a first lighting signal and the one or more PIN lighting devices output one or more second lighting signals;
    determining one or more time offsets between the first lighting signal and the one or more second lighting signals; and
    adjusting the one or more second lighting signals based at least in part on the one or more time offsets to synchronize the first lighting signal and the one or more second lighting signals.

* * * * *